United States Patent [19]

Sakakibara et al.

[11] 4,196,787
[45] Apr. 8, 1980

[54] DESIRED SPEED SIGNAL MEMORY CIRCUIT FOR AN AUTOMOBILE SPEED CONTROL SYSTEM

[75] Inventors: Naoji Sakakibara, Chiryu; Shoji Kawata, Okazaki, both of Japan

[73] Assignee: Aisin Seiki Kabushiki Kaisha, Kariya, Japan

[21] Appl. No.: 896,423

[22] Filed: Apr. 14, 1978

[30] Foreign Application Priority Data

Apr. 14, 1977 [JP] Japan .................. 52-43026

[51] Int. Cl.² ............................................ B60K 31/00
[52] U.S. Cl. .................. 180/179; 123/102; 361/242; 365/149
[58] Field of Search .............. 180/105 E, 105 R, 108; 361/242, 239; 123/102; 365/149

[56] References Cited

U.S. PATENT DOCUMENTS

| Re. 27324 | 3/1972 | Granger | 180/105 R |
| 3,599,052 | 8/1971 | Carp | 180/105 E |
| 3,895,684 | 7/1975 | Nakane | 180/105 E |
| 4,056,157 | 11/1977 | Kawata | 180/105 E |
| 4,094,007 | 6/1978 | Minami | 365/149 X |

*Primary Examiner*—John P. Silverstrim
*Attorney, Agent, or Firm*—Sughrue, Rothwell, Mion, Zinn and Macpeak

[57] ABSTRACT

A desired automobile speed signal memory circuit for an automobile speed control system to maintain actual automobile speed constant at a desired speed. The memory circuit memorizes an actual automobile speed signal at the moment a desired speed set switch is closed. This memorized automobile speed signal is then used as a reference signal by the automobile speed control system to keep the actual automobile speed constant. The memory circuit has a capacitor which memorizes the desired speed signal, a first FET which forms a memorization loop with the capacitor upon the closure of the desired speed set switch, and a second FET which supplies the memorized desired speed signal on the capacitor in an impedance conversion mode as the reference signal used by the automobile speed control system to maintain constant the speed of the automobile.

1 Claim, 3 Drawing Figures

DESIRED SPEED SIGNAL MEMORY CIRCUIT FOR AN AUTOMOBILE SPEED CONTROL SYSTEM

BACKGROUND OF THE INVENTION

The present invention relates to an improvement in an automobile speed control system for controlling actual automobile speed to a desired automobile speed. More particularly, the invention relates to a memory circuit which provides a speed reference signal used to maintain constant speed control in an automobile speed control system.

Speed controls for automobiles are now in commercial use. In such controls, the actual speed of an automobile is compared with a preselected desired value to generate an error signal for controlling the engine throttle valve to a position at which the actual speed equals the desired preselected value. Generally speaking, automatic speed control of automobiles requires stabiliation of the speed control system. If the stabilization should not be sufficient, so-called hunting, i.e., overshoot or undershoot of actual speed of the automobile, occurs. Such hunting can be prevented by deteriorating the responsibility and accuracy of the speed control system.

However, hunting can be prevented without deteriorating this responsibility by employing negative feedback control of the throttle valve as shown in U.S. Pat. No. 3,381,771, issued May 7, 1968. In the invention of this patent, an actual speed indication signal from the tachometer generator of the automobile speedometer and a preselected desired speed indication signal from a speed set potentiometer are supplied to a comparator circuit to generate an error signal which controls the throttle valve position. The error signal is supplied to a differential amplifier circuit together with a throttle position feedback signal (negative feedback signal) from a feedback potentiometer coupled to the throttle valve. The output signal from the differential amplifier circuit is supplied to a vacuum modulator which in response thereto provides to a vacuum motor a vacuum pressure related to the output signal. The vacuum motor is mechanically ganged to the throttle valve and controls its position. Thus the output differential signal of the differential amplifier regulates the position of the throttle valve. The negative feedback of the throttle valve position prevents extra movement of the throttle valve toward opening or closing. Therefore, over-acceleration and -deceleration of the automobile are prevented. The desired speed set on the speed set potentiometer is altered by rotating a lever connected to the slider of the potentiometer.

Similar speed controls for automobiles are disclosed in U.S. Pat. Nos. Re. 27,324, issued Mar. 28, 1972; 3,477,346, issued Nov. 11, 1969; 3,485,316, issued Dec. 23, 1969; and 4,056,157, issued Nov. 1, 1977.

A negative feedback circuit, without a feedback potentiometer, and which compares a speed error signal with an actual automobile speed signal to generate a negative feedback signal, is disclosed in U.S. Pat. No. 3,952,829, issued Apr. 27, 1976. Also, a negative feedback circuit, without a feedback potentiometer, and which includes a circuit means for retarding the speed error signal to be supplied to the desired speed signal generator circuit as the negative feedback signal, is disclosed in U.S. Pat. No. 3,793,622, issued Feb. 19, 1974.

Pat. No. 3,485,316 shows a system to control automobile speed constant and includes a speed memorization capacitor to which a first electric signal, indicating actual speed, is applied, and a set switch to close the charging loop of the capacitor for memorization of the actual desired speed as seen in Pat. No. 3,485,316. Also, the memorized voltage level on the capacitor is supplied to a comparator as the desired speed indication signal. Generally speaking, there are interposed in the charging loop of the capacitor mechanical contacts, such as those of a reed relay which is energized by the set switch. The mechanical contacts of a reed relay have relatively high insulation resistance in the open state and prevent leakage of the capacitor. However, a reed relay is relatively bulky and expensive, and insulation resistances between contacts, as well as between housing and contacts, vary in every relay. Moreover, a reed relay develops a noise induction voltage on the relay coil when it is deenergized, and this noise may undesirably influence the operation of some circuit element. Recently, a field effect transistor (FET) has been employed for switching the charging loop of the capacitor, as seen in Patent No. 4,056,157.

The present invention relates to an improvement of a memory circuit employing a memory capacitor with an FET in the charging loop of the capacitor.

SUMMARY OF THE INVENTION

One object of the present invention is to provide a memory circuit which is relatively compact and not expensive.

Another object is to provide a memory circuit which has a field effect transistor in the charging loop of the memory capacitor and which memorizes the desired automobile speed at a relatively higher voltage level. These and other objects and advantages of the present invention will become readily apparent from the following detailed description.

According to the present invention, a first field effect transistor (FET) is interposed in the charging loop of a memory capacitor as a switching element to form a charging loop between an actual speed signal terminal and a charging terminal of the memory capacitor in accordance with the operation of a set switch. The base of a second FET is connected with the charging terminal of the memory capacitor to supply the memorized voltage level as a desired speed signal in an impedance conversion mode. In a preferred embodiment of the present invention, the input terminal of the first FET is connected with the actual speed signal terminal as well as with the output terminal of a feedback circuit which supplies a feedback signal substantially indicating the position of the throttle valve, so a superposed signal of the actual speed signal and the feedback signal is memorized as the desired speed indication signal. This connection of the first FET enables alteration of the desired speed signal level on the memory capacitor by the ON duration of the first FET.

DESCRIPTION OF THE PREFERRED EMBODIMENT

Figure 1:
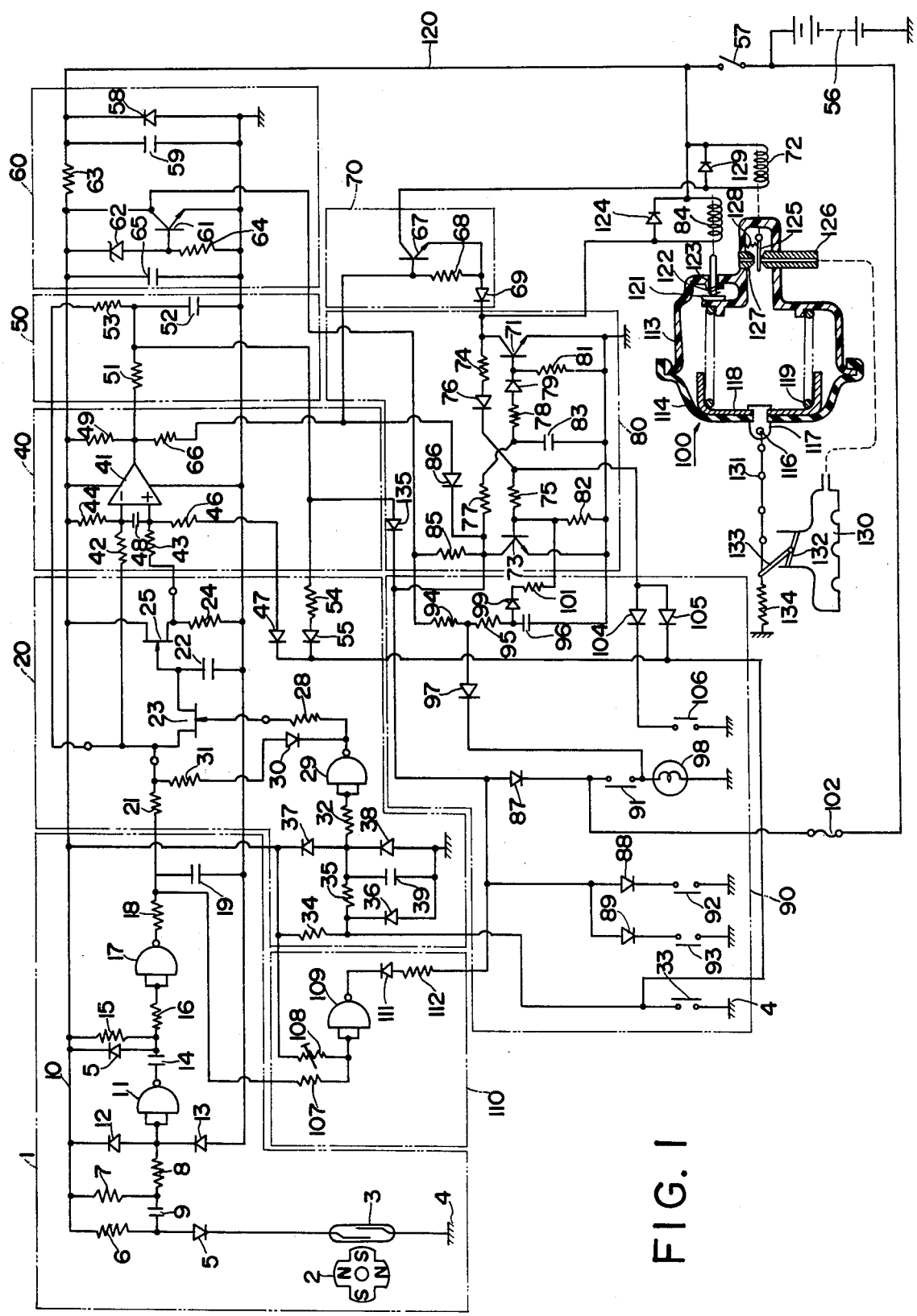
FIG. 1 illustrates a preferred embodiment of the present invention.

Referring to FIG. 1, there is shown a preferred embodiment of the present invention, which comprises an actual speed signal generator circuit 1, a memory circuit 20, a comparator circuit 40, a delay circuit 50, a voltage control circuit 60, a power amplifier circuit 70, a self-maintaining circuit 80, a speed set control circuit 90, a vacuum actuator 100 and a speed set control prohibition circuit 100.

The actual speed signal generator circuit 1 includes a magnet 2 which is driven to rotate at the same speed as the speedometer cable of an automobile. In synchronism with the rotation of the magnet 2, a reed switch 3 opens and closes repeatedly. One terminal of the reed switch 3 is connected to ground 4, and the other terminal is connected through a diode 5 to the connection point between a resistor 7 and a capacitor 9 which are connected to a constant voltage line 10 and to ground, respectively. One terminal of a resistor 8 is connected to the connection point between the resistor 7 and capacitor 9, and the other terminal is connected with the connection point to which the input terminal of a COS/MOS (complementary symmetry metal-oxide semiconductor, e.g., CD4011A of RCA Corporation)-NAND gate 11, the anode of a diode 12, and the cathode of a diode 13 are connected. The diodes 12 and 13 are connected to constant voltage line 10 and ground, respectively. The output of NAND gate 11 is supplied to the input terminal of a NAND gate 17 through a capacitor 14 and a resistor 16. One terminal of a resistor 15 is connected to the connection point between capacitor 14 and resistor 16, and the other terminal is connected to constant voltage line 10. Capacitor 14 and resistor 15 determine the metastable state interval of a monomultivibrator formed by resistor 16 and NAND gate 17. A resistor 18 and a capacitor 19 are connected to the output terminal of NAND gate 17 and form an integration circuit.

The magnet 2 rotates with a speed which is proprotional to the actual speed of the automobile. Thus, the ON, OFF repetition frequency of reed switch 3 is proportional to the actual speed, and the voltage level at the connection point between capacitor 9 and resistor 7 pulsates between the constant voltage level of line 10 and ground level. Capacitor 9 absorbs the high frequency pulsation caused by chattering of the reed segments in the switch 3. Diodes 12 and 13 prevent the application of surges to NAND gate 11. Capacitor 14 and resistor 15 form a timing circuit which provides a constant delay time for the input voltage level to rise to the threshold level of NAND gate 17 after falling down to ground at the output of NAND gate 11. Therefore, the output of NAND gate 17 pulsates one cycle for each ON, OFF cycle of reed switch 3. Namely, NAND gate 17 operates as a monomultivibrator and generates a series of pulses, the positive pulse width of which corresponds to the constant delay time of the timing circuit, and the repetition rate of which is proportional to the actual speed of the automobile. Capacitor 19 is charged by the pulses. Therefore, the voltage level of capacitor 19 indicates the actual speed of the automobile.

The memory circuit 20 memorizes the second electrical signal which indicates the desired speed of the automobile. The memory circuit 20 includes an input resistor 21, a memory capacitor 22, a first FET 23 for analog switching, a second FET 25 for impedance conversion and a resistor 24. The drain of FET 23 is connected to capacitor 19 through resistor 21. The source of FET 23 is connected to the input terminal of capacitor 22. The drain, source and gate of FET 25 are connected to constant voltage line 10, resistor 24 and the input terminal of capacitor 22, respectively. Resistor 24 in turn is connected to ground. Since current can flow from source to drain as well as from drain to source, the source and drain of each FET may be interchanged. The second FET 25 may be included in comparator circuit 40 or comparator 41 as an high impedance element. The gate of FET 23 is connected to the output terminal of a NAND gate 29 through a resistor 28. The output terminal of NAND gate 29 is connected to the input terminal of the actual speed signal line through a diode 30 and a resistor 31. NAND gate 29 receives via resistors 32 and 35 either the voltage level on line 10 through a resistor 34 or ground level through a desired speed set switch 33 of the speed set control circuit 90 fully described hereinafter.

A diode 36 and a capacitor 39 are respectively connected to the input and output terminals of resistor 35 and connected to ground. Resistor 35, capacitor 39 and diodes 36, 37 and 38 are connected to the input stage of NAND gate 29 to absorb the noise toward NAND gate 29.

In the open state of the desired speed set switch 33 of the speed set control circuit 90, the input of NAND gate 29 is at the high level "H" so that output of NAND gate 29 is at the low level "L", whereby FET 23 is in its OFF state. By closing the switch 33, the output of NAND gate 29 switches to high level "H", whereby FET 23 is turned ON, and the voltage level at the connection point between resistors 21 and 31 is supplied to the input terminal of capacitor 22 through FET 23. Thus, the voltage level at the connection point between resistors 21 and 31 is stored or memorized on capacitor 22 and applied to gate of the second FET 25. This gate voltage level of FET 25 indicates the desired speed and is supplied out in an impedance conversion mode as the source voltage of FET 25 in source-follower connection mode. By opening the switch 33, the output of NAND gate 29 switches to low level "L", whereby FET 23 turns OFF. At the same time, the voltage level at the input terminal (connection point between resistors 21 and 31) falls to a voltage level which is determined by the potential divider circuit formed by resistors 21 and 31. Since the gate voltage level and source voltage level of FET 25 are substantially equal, the constant voltage level memorized on capacitor 22 is supplied out from the source of FET 25. The memory circuit 20 thus memorizes a desired speed indication signal upon the closing of the desired speed set switch 33 and supplies it out from the source of FET 25.

The desired speed signal is supplied to the plus input terminal of a voltage level comparator 41 of the comparator circuit 40 through resistor 43. The minus input terminal of comparator 41 is connected to the connection point between resistors 21 and 31 through resistor 42. The plus terminal is connected to the switch 33 through resistor 46 and diode 47. A capacitor 48 connected between the input terminals of comparator 41 absorbs noise. A load resistor 49 is connected between constant voltage line 10 and the output terminal of comparator 41. The output of comparator 41 is high level "H" when the input voltage level of the minus terminal is less than that of the plus terminal, and low level "L" when the former exceeds the latter. Switching transistor 67 in the power amplifier circuit 70 is biased to turn ON or OFF by the output voltage level "H" or "L" of comparator 41 through a resistor 66.

The feedback circuit 50 includes an integration resistor 51 and capacitor 52, as well as feedback resistor 53. The integrated signal on capacitor 52, i.e., the delayed output of comparator 41, is fed back to the input terminal (connection point between resistors 21 and 31) through resistor 53. The connection point between resistor 51 and capacitor 52 is connected to the switch 33 through a resistor 54 and diode 55.

The voltage control circuit 60 includes a diode for shunting reverse polarity voltage which might be applied to power line 120, a capacitor 59 for noise absorption, a shunt transistor 61, a Zener diode 62, a capacitor 65 for ripple absorption and resistors 63 and 64. By closing main switch 57, the voltage of power source 56 is applied to load resistor 63. Zener diode 62 breaks down when the voltage level of line 10 exceeds the breakdown voltage level of Zener diode 62, at which time transistor 61 becomes deeply biased to conduct in a lower impedance, thereby increasing the voltage drop across load resistor 63 and causing the voltage level of line 10 to fall to the breakdown voltage of Zener diode 62. When the voltage level of line 10 is less than the breakdown voltage of Zener diode 62, the voltage across resistor 64 is lowered, so that transistor 61 is slightly biased to conduct in a higher impedance, thereby decreasing the voltage drop across load resistor 63 and raising the voltage level of line 10. Thus, the voltage level of line 10 is kept constant by the operation of Zener diode 62 and transistor 61.

The collector of switching transistor 67 of the power amplifier circuit 70 is connected to a modulator valve solenoid 72 which in turn is connected to power source 56 through main switch 57. The ON or OFF switching signal of high level "H" or low level "L" is applied to the base of transistor 67 from comparator 71 as described hereinbefore. The emitter of transistor 67 is connected to the collector of a transistor 71 through diode 69 and to the base of a transistor 73 through resistor 74, diode 76 and resistor 75.

The self-maintaining circuit 80 includes the transistors 71 and 73 which form a bistable multivibrator. The collector of transistor 71 is connected to the base of transistor 73 through diode 76 and resistors 74 and 75. The collector of transistor 73 is connected to the base of transistor 71 through a diode 79 and resistors 77 and 78. The output of comparator 41 through resistor 66 and diode 86, the integrated signal level of capacitor 52 (the delayed output of comparator 41) through a diode 135, and the voltage level of line 10 through a resistor 85 are all applied to the collector of transistor 73. The bases of transistors 71 and 73 are connected to ground by resistors 81 and 82, respectively. A capacitor 83 is connected between ground and the connection point between resistors 77 and 78. The collector of transistor 71 is connected to a release solenoid 84 which in turn is connected to power source 56 through main switch 57. The collector of transistor 73 is connected to stop switch 91 through a diode 87 and also connected to clutch switch 92 and parking brake switch 93 through diodes 88 and 89, respectively.

The speed set control circuit 90 includes the desired speed set switch 33, stop switch 91, clutch switch 92, parking brake switch 93 and resume switch 106. A stop indication lamp 98 is serially connected with stop switch 91. The connection point between lamp 98 and stop switch 91 is connected to line 10 through a diode 97 and resistor 94, which in turn is connected to the base of transistor 73 through resistors 95, 101 and diode 99 and also connected to ground through resistor 95 and capacitor 96. The connection point between stop switch 91 and diode 87 is connected to power source 56 through a fuse 102. The connection point between resistor 75 and diode 76 (base of transistor 73) is connected to resume switch 106 through diode 104 and also to the desired speed set switch 33 through diode 105.

The speed set control prohibition circuit 110 includes a NAND gate 109, diode 111 and resistor 112. NAND gate 109 receives the actual speed indication signal from capacitor 19 of the actual speed signal generator circuit 1 through resistor 107 and the voltage on line 10 through resistor 108. At an actual speed of greater than a predetermined higher speed, the input of NAND gate 109 exceeds the threshold level of NAND gate 109, and the output of NAND gate 109 is at low level "L", thereby causing transistor 71 to turn OFF. However, if the actual speed is less than the predetermined higher speed, the output of NAND gate 109 is high level "H". Thus, the speed set control protection circuit 110 detects an actual speed of the automobile over the predetermined higher value and causes transistor 71 to turn OFF. The reference predetermined higher value is adjusted by resistor 108.

The vacuum actuator 100 is employed as a transducer to convert the electrical signal for controlling the throttle valve position into a mechanical movement of a link member connected to the throttle valve of the engine in the automobile. The actuator 100 includes a flexible diaphragm 114 having a hermetically sealed housing 113 which forms a pressure compartment 115 therein. A pressure plate 118 in pressure compartment 115 is connected to flexible diaphragm 114 by a caulked rivet 117. A compression spring 119 contained by pressure compartment 115 tends to expand compartment 115 by pushing plate 118 toward the left. A release valve 121 is normally biased to connect pressure compartment 115 to outer atmospheric pressure by a compression spring 122. By energizing release valve solenoid 84, release valve 121 contacts the valve seat 123 of housing 113. A diode 124 connected across solenoid 84 shunts surges which might be applied to transistor 71 or solenoid 84. A modulator valve 125 in pressure compartment 115 is normally biased by a compression spring 128 to close a vacuum nozzle 126 connected to intake manifold 130 of the engine on the automobile and to open an atmospheric pressure nozzle 127. By energizing modulator valve solenoid 72, modulator valve 125 is forced against compression spring 128 to open vacuum nozzle 126 in pressure compartment 115 and to close atmospheric pressure nozzle 127, whereby flexible diaphragm 114 is forced to compress pressure compartment 115 with negative vacuum in compartment 115. One end of a chain 131 is connected to rivet 117 through its hole 116. The other end of chain 131 is connected to a lever 133 which drives throttle valve 132. A tension spring 134 normally biases lever 133 toward closure of throttle valve 132.

Upon the closing of main switch 57, base current flows to transistor 73 from power source 56 through main switch 57, release valve solenoid 84, resistor 74, diode 76 and resistor 75. Thus, transistor 73 turns ON. However, transistor 71 does not turn ON in spite of the application of the voltage of line 10 to the base of transistor 71 through resistors 85, 77, 78 and diode 79, because capacitor 83 delays application of base bias voltage to the base of transistor 71, and the turn ON of transistor 73 connects the base of transistor 71 to ground. During the ON state of transistor 73, the base of transistor 67 is connected to ground through diode 86 and transistor 73. Thus, transistor 67 remains in the OFF state, even if the output of comparator 41 is at high level "H". The base current through release valve solenoid 84 to transistor 73 is smaller than the energization current value or the energization maintaining current value of release valve solenoid 84. Thus, solenoids 72 and 84 are not energized. Therefore, release valve 121 and modulator valve 125 are at the position shown in FIG. 1, and pressure compartment 115 is at atmospheric pressure, whereby flexible diaphragm 114 is at the outermost position shown in FIG. 1. The actual speed of the automobile is controlled by operating the throttle valve 132 to any position by an accelerator pedal and linkage members (not shown).

By closing the desired speed set switch 33, the base of transistor 73 is connected to ground through resistor 75, diode 105 and switch 33. Thus, transistor 73 turns OFF, and transistor 71 turns ON, whereby the base of transistor 73 is connected to ground through resistors 74 and 75, diode 76 and transistor 71. Transistors 71 and 73 remain ON and OFF, respectively, after opening of switch 33. The emitter of transistor 67 is connected to ground through diode 69 and transistor 71. Release valve solenoid 84 is energized by the turn ON of transistor 71. Thus, release valve 121 closes valve seat 123. During the closure of desired speed set switch 33, integration capacitor 52 discharges to ground through resistor 54, diode 55 and switch 33. The output high level "H" of NAND gate 29 turns ON the first FET 23 which applies the actual speed signal to memory capacitor 22. Furthermore, the plus terminal of comparator 41 is connected to ground through resistor 46, diode 47 and switch 33; therefore, the voltage level of the minus terminal of comparator 41 exceeds that of the plus terminal, so that comparator 41 supplies out low level "L". Thus, transistor 67 does not turn ON, and modulator valve solenoid 72 is not energized.

Upon the opening of desired speed set switch 33, the output level of NAND gate 29 switches to low level "L", whereby FET 23 turns OFF. At this time, the actual speed signal is memorized or stored in memory capacitor 22 and supplied to the plus terminal of comparator 41 through FET 25. The memorized voltage level on memory capacitor 22 corresponds to the actual speed of the automobile at the time when the desired speed set switch 33 is opened as described hereinbefore. Shunt resistor 46 is disconnected from ground by the opening of switch 33, and the voltage level of the plus input terminal of comparator 41 rises to the memorized voltage, and the actual speed signal level falls through resistor 31. Therefore, comparator 41 supplies out high level "H". Since capacitor 19 integrates pulses from NAND gate 17, ripple appears at the source of FET 23 through resistor 21 and capacitor 22. Therefore, the output of comparator 41 pulsates between "H" and "L", and causes ON, OFF pulsation of transistor 67, thereby alternately energizing and deenergizing modulator valve solenoid 72. Therefore, modulator valve 125 repeatedly opens and closes nozzles 126 and 127. Thus, vacuum is applied to pressure compartment 115.

In the moment after the opening of desired speed set switch 33, the energized duration (time interval that valve 125 closes atmospheric pressure nozzle 127 and opens vacuum nozzle 126 of solenoid 72) is relatively long, because the voltage on memory capacitor 22 is higher than the mean level of the voltage at the connection point between resistors 21 and 31, and also the feedback voltage level of integration capacitor 52 is low. Thus, the vacuum (negative pressure against atmosphere) increases in pressure compartment 115 at a high speed. As time goes on, the energized duration of modulator valve solenoid 72 decreases gradually, because the feedback voltage level of integration capacitor 52 rises gradually, and the voltage level of the minus input terminal of comparator 41 rises gradually through capacitor 22 and FET 23. Therefore, the vacuum in pressure compartment 115 increases more and more slowly as time goes on, until, finally, the energization duration of modulator valve solenoid 72 becomes constant and holds the vacuum in compartment 115 at a constant value, whereby throttle valve 132 is held at the position at which the automobile runs at the speed existing when the desired speed set switch 33 was closed.

This throttle valve position control is achieved in a short time. Thereafter, if the actual speed of the automobile rises and the voltage level of capacitor 19 rises, the minus input voltage of comparator 41 rises in correspondence with the increase of actual speed. Thus, the duration of high level "H" of the pulsating output of comparator 41, as well as the energization duration of solenoid 72, decreases in synchronism with the discharge of capacitor 52. Therefore, the vacuum in compartment 115 decreases gradually to operate throttle valve 132 towards its closed position. During this operation capacitor 52 continues to discharge, and the actual speed of the automobile decreases gradually. Finally, the energization duration of solenoid 72 becomes shorter and constant to hold the vacuum in compartment 115 at a constant lower value, whereby throttle valve 132 is held at the position at which the automobile runs at the speed existing when the desired speed switch 33 was closed.

In another case, if the actual speed of the automobile falls and the voltage level of capacitor 19 falls, the minus input voltage of comparator 41 falls in correspondence with the decrease of actual speed. Thus, the duration of high level "H" of the pulsating output of comparator 41, as well as the energization duration of solenoid 72, become longer. Therefore, the vacuum in compartment 115 increases to operate throttle valve 132 toward its fully opened position. However, the feedback voltage on capacitor 52 rises by integration of output "H" of longer duration. Therefore, the "H" duration of pulsating output of comparator 41, as well as the energization duration of solenoid 72, decreases gradually from the longer one. Finally, the energization duration of solenoid 72 becomes longer and constant to hold the vacuum in compartment 115 at a constant higher value, whereby throttle valve 132 is held at the position at which the automobile runs at the speed existing when the desired speed switch 33 was closed. As described hereinbefore, the constant speed control of the automobile is processed automatically by the system shown in FIG. 1 after acceleration or deceleration of the automobile to a desired speed and closing the desired speed set switch 33 in a moment.

Thereafter, alteration of the speed set in the system is readily possible by operating the desired speed set switch 33. As described hereinbefore, the output pulses of NAND gate 17 are transmitted as a ripple to the minus input terminal of comparator 41, and the output of comparator 41 pulsates. The "H" level duration of the pulsating output of comparator 41 becomes longer, and the "L" level duration becomes shorter, as the voltage level of capacitor 19 (actual speed) becomes lower. Thus, the opening duration of vacuum nozzle 126 becomes longer, whereas the opening duration of atmospheric pressure nozzle 127 becomes shorter. Thus, the vacuum in pressure compartment 115 increases to a value at which the actual speed balances the speed set by the switch 33. Thus, the voltage of integration capacitor 52 is a constant one at the desired speed set by the switch 33. By closing the switch 33, capacitor 52 discharges through resistor 54, diode 55 and switch 33 to ground. However, the capacitance of capacitor 52 and the resistance of resistor 54 are so determined as to have a discharge time constant of about 1 to 2 sec. or so. Thus, the fall of the voltage on capacitor 52 is relatively slow. Therefore, some voltage remains on capacitor 52 after the closing of the switch 33 in a short time, and the voltage level of the actual speed signal level plus the voltage level of capacitor 52 is memorized on memory capacitor 22 at the time when the switch 33 opens. Thus, the higher speed is memorized on memory capacitor 22, and the system shown in FIG. 1 automatically operates to drive the automobile at the higher constant speed. The shorter the closure time of the switch 33, the higher the desired speed memorized on memory capacitor 22. On the other hand, the voltage level of the plus terminal of comparator 41 falls to a lower level during closure of the switch 33 through resistor 46, diode 47 and switch 33. Therefore, the duration of level "H" of the pulsating output of comparator 41 becomes shorter. Thus, the vacuum in pressure compartment 115 decreases gradually during closure of switch 33, and throttle valve 132 moves toward its closed position to reduce the actual speed. The longer the closure of the switch 33, the lower is the actual speed of the automobile and the voltage of capacitor 52, whereby the memorized desired speed on memory capacitor 22 at the opening of the switch 33 is lower than the previously memorized one. Therefore, the speed level to be memorized on capacitor 22 is readily adjusted by the closure time duration of the desired speed set switch 33. Repetition of shorter time closures of the switch 33 raises rapidly the speed indication signal level memorized on memory capacitor 22.

The constant speed control operation is cancelled by momentary closure of stop lamp switch 91, clutch switch 92 or parking brake switch 93. Assuming that the stop lamp switch 91 is closed, transistor 73 is biased to turn ON by the voltage level of line 10 through resistor 94, 95, diode 99 and resistor 101 (the serial connection of resistor 95, diode 99 and resistor 101 is shunted to ground through diode 97 and stop lamp 98 in the closed state of the switch 91). Thus, transistor 71 turns OFF. Therefore, release valve solenoid 84 is deenergized, and release valve 121 moves from valve seat 123. Then, the inner pressure of pressure compartment 115 rises to atmospheric pressure rapidly, thereby driving flexible diaphragm 114 toward the left, as shown in FIG. 1. The throttle valve 132 closes rapidly. At the same time, the base of transistor 67 is connected to ground through diode 86 and transistor 73. The transistor 67 turns OFF, and modulator valve solenoid 72 is deenergized. The capacitor 52 discharges through diodes 135, 87, switch 91 and lamp 98. A capacitor 96 absorbs surges which may occur on the electrical wiring of stop lamp 98. Assuming that the clutch switch 92 or parking brake switch 93 is closed momentarily, transistors 71 and 73 turn OFF and ON, respectively, because the base current to transistor 71 through resistors 77, 78 and diode 79 is shunted to ground through diode 88 and switch 92, or diode 89 and switch 93.

To drive the automobile with automatically controlled constant speed after a brake operation or a clutch operation, i.e., after momentary closure of the switch 91, 92 or 93, the driver operates resume switch 106 to close it momentarily. Upon closing of the resume switch 106, the base current to transistor 73 through resistor 75 is shunted by diode 104 and switch 106. Thus, transistor 73 turns OFF, and transistor 71 turns ON. Therefore, release valve solenoid 84 is energized, and modulator valve solenoid 72 is energized in correspondence with the pulsating output of comparator 41. Thereafter, the system operates in constant speed control mode.

If actual speed rises above a predetermined speed and the input voltage level of NAND gate 109 rises above the threshold level of NAND gate 109, the output of NAND gate 109 switches to low level "L", which is applied to the base of transistor 71 through diode 111 and resistor 112 as well as resistors 77, 78 and diode 79. Then, transistor 71 turns OFF, and transistor 73 turns ON. Thus, the constant speed control operation is cancelled. This cancellation prevents constant speed control at extremely high actual speeds.

If the actual speed falls under a predetermined speed (for example 30 km/h), or, if the actual speed signal disappears for any reason, the source voltage of FET 23 (namely the connection point between resistors 21 and 31) falls and becomes substantially equal to the base voltage thereof. Current is supposed to flow between the drain and source of FET 23, assuming that the FET 23 is the depression type and the voltage difference $V_{GS}$ between gate and source is within $-1.3$ V (minus 1.3 V). Thus, the voltage on memory capacitor 22 falls to substantially zero. Thus, the voltage level at the minus terminal of comparator 41 greatly exceeds that of the plus terminal, and the output of comparator 41 becomes low level "L". Therefore, solenoid 72 is deenergized to cancel the constant speed control. As a result, a constant speed control prohibition circuit to cancel the constant speed control operation at speeds below the predetermined lower speed is not required.

The fuse 102 of lamp circuit 98 may rupture, in which case base current of transistor 71 is shunted through diode 87 and resistor 103 upon closure of stop switch 91. Thus, transistor 71 turns OFF, and the constant speed control operation is cancelled.

The vacuum applied to nozzle 126 from intake manifold 130 does not fluctuate substantially. Even if the vacuum value in the intake manifold 130 varies, control of actual speed is not affected, because the vacuum in the pressure compartment 115 is controlled so as to maintain the actual speed constant with that memorized on memory capacitor 22.

The feedback circuit 50 accumulates or integrates the output pulses from comparator 41 and provides the input terminal of memory capacitor 22 with an integrated voltage level on capacitor 52 as a negative feedback signal as described hereinbefore. The integrated voltage on capacitor 52 is constant during the time when the automobile runs at the desired speed memorized on memory capacitor 22. When actual speed falls from the desired speed, the duration of the high level "H" of the pulsating output from comparator 41 becomes longer, and the inner vacuum of pressure compartment 115 increases gradually to increase actual speed. However, increase of actual speed lags behind increases of the inner vacuum of compartment 115. The integrated voltage level of capacitor 52 gradually rises during increase of inner vacuum, thereby gradually raising both the voltage of the minus input terminal of comparator 41 and the actual speed. Then, the high level "H" duration of the pulsating output of comparator 41 becomes gradually shorter, and the vacuum increase in pressure compartment 115, as well as the charging rate of capacitor 52, are decreased gradually. Finally, at the desired speed, the increase of the voltage on the capacitor 52 and the inner vacuum of the pressure compartment 115 cease. In this manner, the integration capacitor 52 provides the minus input terminal of comparator 41 with a negative feedback signal to limit the duration of the acceleration signal to actuator 100 and move throttle valve 132 smoothly in a stabilized mode to a new position at which the automobile runs at the desired speed, and the voltage level of capacitor 52 stabilizes at a constant level which corresponds to the throttle valve position. When the actual speed rises from the desired speed, the duration of high level "H" of the pulsating output of comparator 41 becomes shorter, and the inner vacuum of pressure compartment 115 decreases gradually to decrease actual speed. However, decrease of actual speed lags behind decrease of the inner vacuum of compartment 115. The integrated voltage level of capacitor 52 gradually falls during decrease of the inner vacuum, whereby the voltage of the minus input terminal of comparator 41 falls gradually, and actual speed falls gradually. Then, the high level "H" duration of the pulsating output of comparator 41 gradually becomes longer, and the vacuum decrease in pressure compartment 115, as well as the discharging rate of capacitor 52, is decreased gradually. Finally, at the desired speed, the decrease of the voltage on capacitor 52 and of the inner vacuum of pressure compartment 115 cease. In this manner, the integration capacitor 52 provides the minus input terminal of comparator 41 with a negative feedback signal to limit the duration of the deceleration signal to actuator 100 and move throttle valve 132 smoothly in a stabilized mode to a new position at which the automobile runs at the desired speed. The system thus controls throttle valve 132 in phase leading mode with feedback circuit 50. Without the negative feedback signal of feedback circuit 50, over-acceleration or -deceleration may occur due to the delay in the control of the actual speed by throttle valve 132 and actuator 100, and thus hunting of the actual speed may occur.

The comparator circuit 40 in the system shown in FIG. 1 is employed for controlling the inner vacuum of compartment 115 with modulator valve solenoid 72 in duty-cycle operation mode. The output positive pulse duration of comparator 41 corresponds to the error signal level which indicates the difference between actual speed and the desired speed memorized on capacitor 22.

Figure 2:
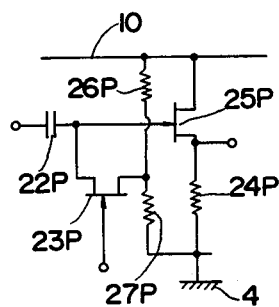
FIG. 2 illustrates a prior art memory circuit.

A prior art memory circuit having a first and a second FET 23P and 25P is shown in FIG. 2. This memory circuit includes a memory capacitor 22P, a first FET 23P, a second FET 25P and resistors 24P, 26P and 27P. The first FET 23P for analog switching is connected between the gate of FET 25P and the connection point of resistors 26P and 27P. The input terminal of the capacitor 22P may be connected to the actual speed signal line, and the output terminal of the capacitor 22P is connected to the base of the FET 25P. By applying the high voltage "H" to the base of the FET 23P, a reference voltage "C" at the connection point between the resistors 26P and 27P is supplied to the output terminal of the capacitor 22P and gate of the FET 25P through the FET 23P. Thus, the voltage difference "A-C" between voltage level "A", indicating actual speed signal level at the input terminal of the capacitor 22P, and the reference voltage "C" is applied to the capacitor 22P. Therefore, the voltage difference "A-C" is memorized on the capacitor 22P.

The difference between the memory circuit of the present invention shown in FIG. 1 and that of the prior art shown in FIG. 2 is as follows. Assuming that the level of the actual speed signal varies as the linear line a shown in FIG. 3 and that the line voltage of line 10 is 6 (V) against ground 4, then the actual speed signal is not memorized on capacitor 22 in the memory circuit of the present invention at the time when actual speed is under 31 km/h, even if the gate voltage level of FET 23 is 0 (V), i.e., ground level, because the differential voltage $V_{GS}$ between the gate and source of FET 23 is within $-1.3$ (V). That is, although actual speed were memorized, it will be discharged as described hereinbefore (the $-1.3$ (V) may not be constant in any FET and varies in some range in every FET). At an actual speed over 40 km/h, the differential voltage $V_{GS}$ rises enough to turn OFF the FET 23, and thus the actual speed signal is memorized on capacitor 22. This gate voltage level of FET 25 is a constant voltage level within a range from 1.7 (V) to 5 (V) (which corresponds to a speed range from 40 km/h to 120 km/h). The constant voltage is supplied out in impedance conversion mode.

As compared with this, the $V_{GS}$ of the FET 23P is half (3 volts) of the line voltage (6 volts) of the line 10, and the FET 23P may be in the OFF state in the memory circuit shown in FIG. 2, assuming that the voltage level at the connection point between 26P and 27P is 3 volts. However, assuming that actual speed falls to 60 km/h (signal level: 2.5 V) from the memorized desired speed 120 km/h (5 V) with cancel operation of the system due to brake operation, then, if the resume switch is closed, the desired speed of 120 km/h is not obtained. Namely, if the actual speed once falls from the desired 120 km/h to 60 km/h, the actual speed signal level falls to 2.5 (V), whereby the FET 23P turns ON, and the capacitor 22P memorizes a signal level under 120 km/h. Thus, the speed set on the capacitor 22P varies against the driver's will. In addition, assuming that actual speed is increased to 120 km/h by depression of the accelerator pedal, the base voltage of FET 25P rises to $3+(5-1.7)$ or $+6.3$ (V) which exceeds the drain voltage of FET 25P, and thus leakage current flows between the gate and drain of FET 25P. Then, the constant speed after the release of the accelerator pedal becomes higher than 40 km/h.

Figure 3:
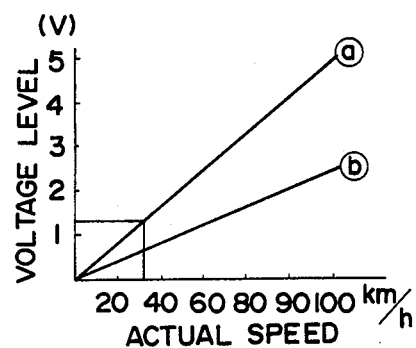
FIG. 3 is a graph showing the actual speed signal level against actual speed.

As a result, the memory circuit shown in FIG. 2 is not employed for constant automobile speed control with an actual speed signal of greater slope as shown by a in FIG. 3. An actual speed signal of less slope, as shown by b in FIG. 3, should be designed for the prior memory circuit to keep actual speed constant at will within a range of 40–120 km/h.

However, in the memory circuit of the present invention it is possible to employ the higher slope actual speed signal a within a range of 40–120 km/h and also in a range of under 40 km/h by applying a constant bias voltage to maintain OFF the FET 23 against the $V_{GS}$ of FET 23.

As will be understood from the foregoing description, the improved memory circuit of the present invention employs an FET which is compact and has high impedance. Furthermore, a constant speed control prohibition circuit to cancel the constant speed control operation for speeds below a predetermined lower speed is not required, due to the construction of the improved memory circuit of the invention. Also, an actual speed signal of greater slope can be employed with the memory circuit of the invention. Operation at steeper slopes of the actual speed signal, which corresponds to actual speed, also provides the following advantages: the memory circuit, as well as the constant speed control system, are durable against noise; and the actual speed signal is durable against variations in temperature and voltage in the actual speed signal generator circuit.

Obviously many modifications and variations of the present invention are possible in light of the above teachings. It is therefore to be understood that, within the scope of the appended claims, the invention may be practiced otherwise than as specifically disclosed.

We claim:

1. In an automobile speed control system having an actual speed signal input terminal, means for providing an actual speed signal, a desired speed signal memory circuit, comparing means for comparing the desired and actual speed signals and having first and second input terminals for receiving said actual and desired speed signals, respectively, and means responsive to the comparison for controlling a throttle valve of the automobile, the improvement comprising feedback circuit means for providing at an output terminal thereof a feedback signal substantially indicating the position of the throttle valve, said output terminal being connected to said first input terminal for supplying the feedback signal to said comparing means; and wherein said desired speed signal memory circuit comprises: a memory capacitor having a terminal; a first field effect transistor having an input terminal connected to the actual speed signal input terminal and an output terminal connected to the terminal of said memory capacitor; and a second field effect transistor, the base of which is connected to the terminal of said memory capacitor, for supplying the desired speed signal to said second input terminal of said comparing means; the input terminal of said first field effect transistor also being connected to the output terminal of said feedback circuit means.

* * * * *